US011319909B1

(12) United States Patent
Zhang

(10) Patent No.: US 11,319,909 B1
(45) Date of Patent: May 3, 2022

(54) EXHAUST GAS RECIRCULATION MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/115,575

(22) Filed: Dec. 8, 2020

(51) Int. Cl.
| | | |
|---|---|---|
| F02M 35/10 | (2006.01) | |
| F02M 26/17 | (2016.01) | |
| F02M 26/14 | (2016.01) | |
| B01F 3/02 | (2006.01) | |
| B01F 5/06 | (2006.01) | |
| B01F 5/00 | (2006.01) | |

(52) U.S. Cl.
CPC ......... *F02M 35/10262* (2013.01); *B01F 3/02* (2013.01); *B01F 5/0647* (2013.01); *B01F 5/0648* (2013.01); *F02M 26/14* (2016.02); *F02M 26/17* (2016.02); *F02M 35/10222* (2013.01); *B01F 2005/0025* (2013.01)

(58) Field of Classification Search
CPC ....... F02M 35/10262; F02M 35/10222; F02M 26/14; F02M 26/17; B01F 5/0648; B01F 5/0647; B01F 3/02; B01F 2005/0025
See application file for complete search history.

(56) References Cited

U.S. PATENT DOCUMENTS

| | | | | |
|---|---|---|---|---|
| 5,492,104 | A * | 2/1996 | Elder | F02B 47/08 123/568.17 |
| 6,427,671 | B1 * | 8/2002 | Holze | B01F 5/045 123/568.17 |
| 6,672,292 | B2 | 1/2004 | Fischer | |
| 7,128,039 | B2 * | 10/2006 | Cooper | F02M 35/10032 123/184.47 |
| 7,740,008 | B2 * | 6/2010 | Brogdon | F02M 26/19 123/568.15 |
| 7,908,859 | B2 * | 3/2011 | Carlsson | H04W 52/40 60/605.2 |
| 9,051,900 | B2 | 6/2015 | Teng et al. | |
| 10,408,169 | B2 * | 9/2019 | Zhang | F02M 26/19 |
| 2011/0061634 | A1 * | 3/2011 | Sponsky | B01F 3/02 123/568.17 |
| 2016/0160804 | A1 * | 6/2016 | Dettloff | F02M 26/19 123/568.17 |
| 2016/0160805 | A1 * | 6/2016 | Polcyn | F02M 26/70 123/568.18 |
| 2016/0201610 | A1 * | 7/2016 | Dahl | F02M 26/19 123/568.17 |
| 2017/0254245 | A1 * | 9/2017 | Zhang | F01N 3/2066 |

(Continued)

*Primary Examiner* — Xiao En Mo
(74) *Attorney, Agent, or Firm* — Geoffrey Brumbaugh; McCoy Russell LLP

(57) ABSTRACT

A mixer for a gas flow system, such as an exhaust gas recirculation system, is provided. In one example, a gas flow system for an engine includes a first passage through which a first gas is configured to flow along a first axis; a second passage through which a second gas is configured to flow along a second axis, the first passage fluidly coupled to the second passage at an outlet of the first passage; and a mixer integrated with the first passage at the outlet and extending into the second passage, the mixer including an extension extending radially around the first axis and a main body extending into the second passage along the first axis.

20 Claims, 7 Drawing Sheets

(56) References Cited

U.S. PATENT DOCUMENTS

2017/0306899 A1* 10/2017 Sanami .................. F02M 26/17
2018/0058388 A1* 3/2018 Zhang .................. B01F 5/0421
2019/0085794 A1 3/2019 Zhang
2019/0093604 A1* 3/2019 Hampson ............... F02M 26/19

* cited by examiner

EXHAUST GAS RECIRCULATION MIXER

FIELD

The present description relates generally to an air intake system for a vehicle, and more specifically to a mixer to mix recirculated exhaust gas with intake air.

BACKGROUND/SUMMARY

In an effort to meet stringent federal government emissions standards, engine systems may be configured with a plurality of technologies for decreasing emissions, such as nitrogen oxide (NOx) emissions. One example technology for decreasing NOx may include exhaust gas recirculation (EGR). Reducing NOx via EGR includes recirculating a controllable proportion of the engine's exhaust back into an intake passage to combine with intake air. The addition of EGR may not chemically participate in combustion (e.g., the gas is substantially inert) and may reduce an amount of cylinder contents available for combustion. This may lead to a correspondingly lower peak cylinder temperature and heat release. By doing this, NOx emissions may be decreased.

However, as recognized by the inventors herein, issues may arise upon flowing EGR into the intake passage. In one example, EGR is introduced into the intake passage before the intake passage divides upstream of a multi-cylinder engine. Desired EGR mixing with intake air may be difficult to achieve at various engine speeds/loads, particularly when an EGR passage couples to the intake passage at a substantially perpendicular angle, which may lead to uneven distribution of the EGR/intake air mixture. For example, one cylinder may receive too much EGR, possibly resulting in increased particulate emissions, and another cylinder may receive too little EGR, possibly resulting in increased NOx emissions.

Attempts to address insufficient mixing include introducing a mixing device at a junction between an EGR outlet of an EGR passage and an intake passage such that dispersion of EGR may be more homogenous. However, the inventors herein have recognized potential issues with such systems. As one example, some mixers may be difficult or costly to manufacture. As another example, some mixers may prevent sufficient flow of EGR, thereby increasing exhaust backpressure and decreasing engine efficiency.

In one example, the issues described above may be addressed by a gas flow system for an engine including a first passage through which a first gas is configured to flow along a first axis; a second passage through which a second gas is configured to flow along a second axis, the first passage fluidly coupled to the second passage at an outlet of the first passage; and a mixer integrated with the first passage at the outlet and extending into the second passage, the mixer including an extension extending radially around the first axis and a main body extending into the second passage along the first axis.

In this way, the first gas (which may be exhaust gas recirculated from the engine) may be directed from the first passage into a center of the second passage via the main body and extension of the mixer, while the main body of the mixer diverts flow of the second gas (which may be intake air) around the center of the second passage (e.g., preferentially diverting the second gas towards the lateral sides and bottom of the second passage). In doing so, the first gas may be evenly mixed with the second gas downstream of the mixer. The mixer may not obstruct flow of the first gas, and may be integrally formed with the first passage. In this way, manufacturing costs may be reduced and exhaust gas backpressure may be lowered relative to other mixers.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
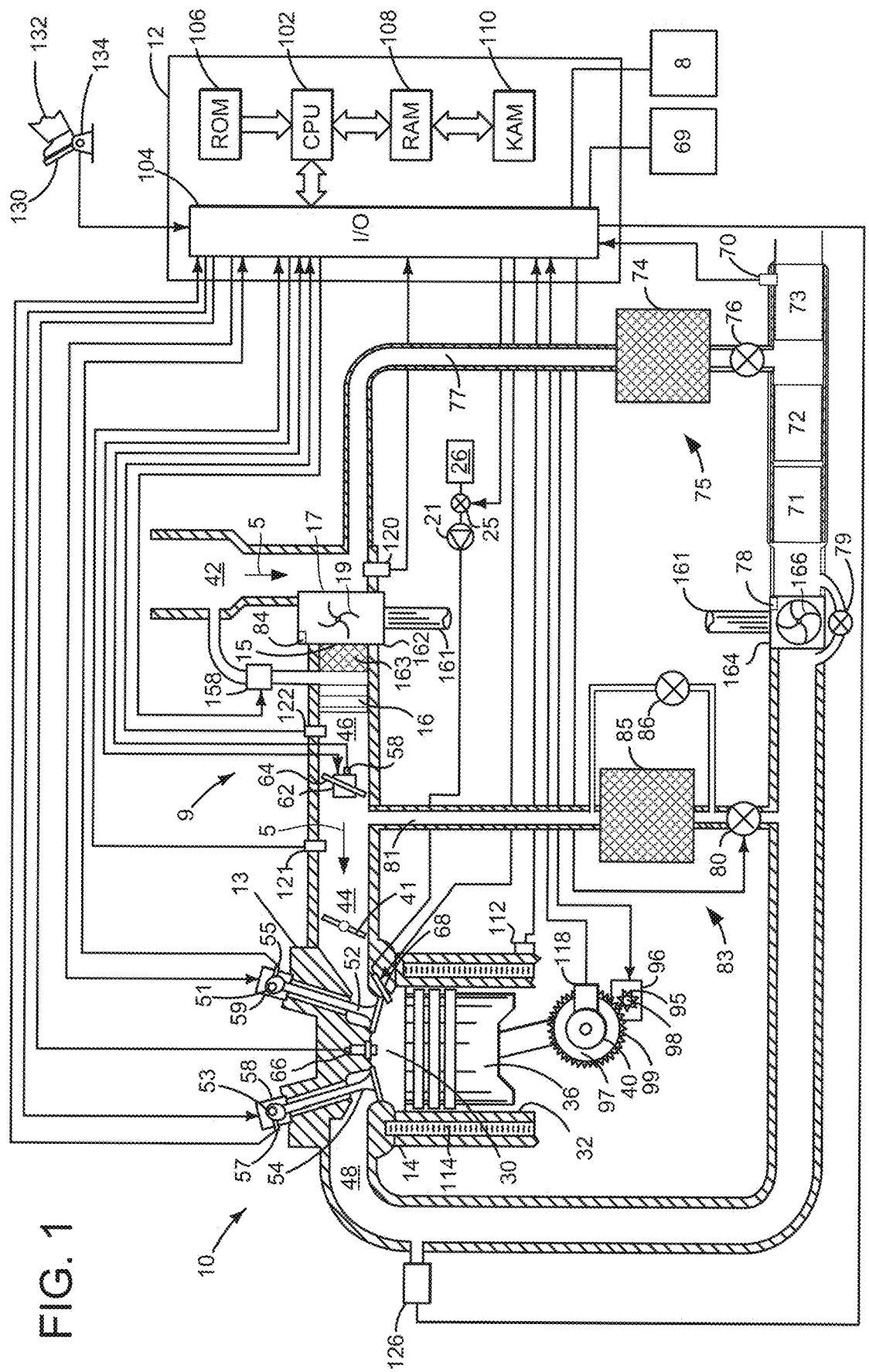
FIG. 1 schematically shows one cylinder of an example engine with an exhaust gas recirculation (EGR) system.
Figure 2:
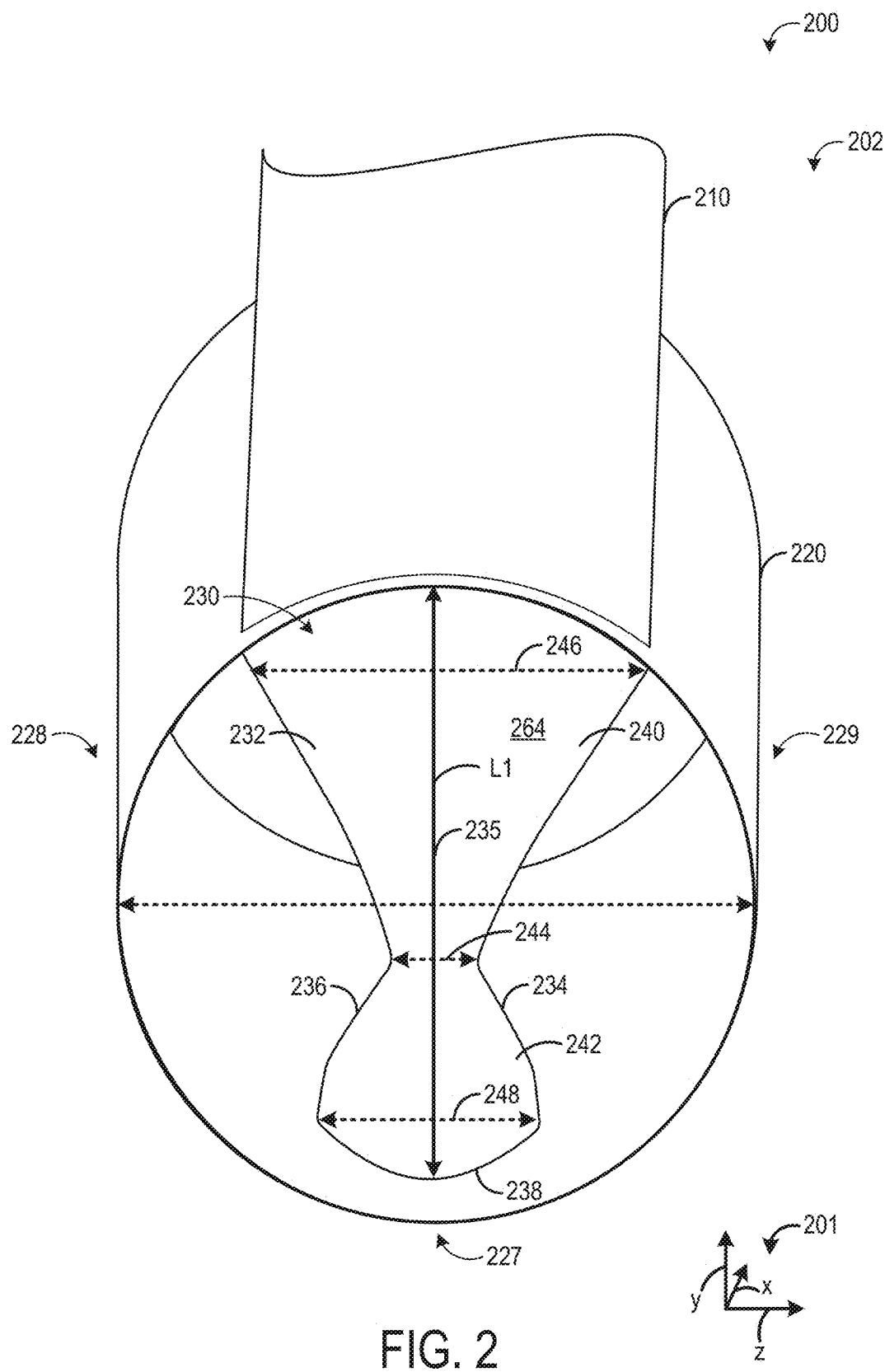
FIGS. 2-4 show perspective views of an EGR mixer coupled to an EGR passage fluidly joined to an intake passage.
Figure 3:
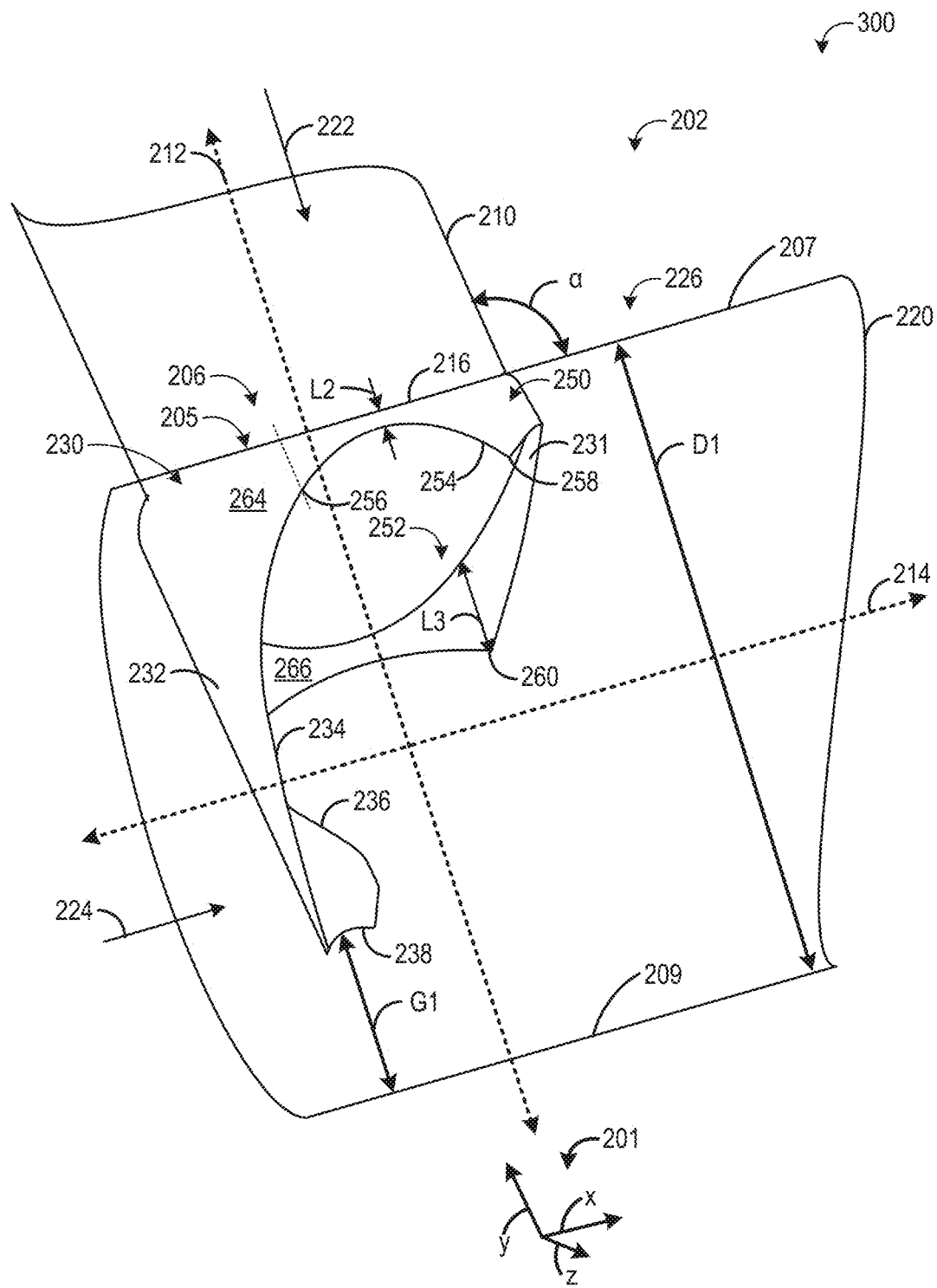
Figure 4:
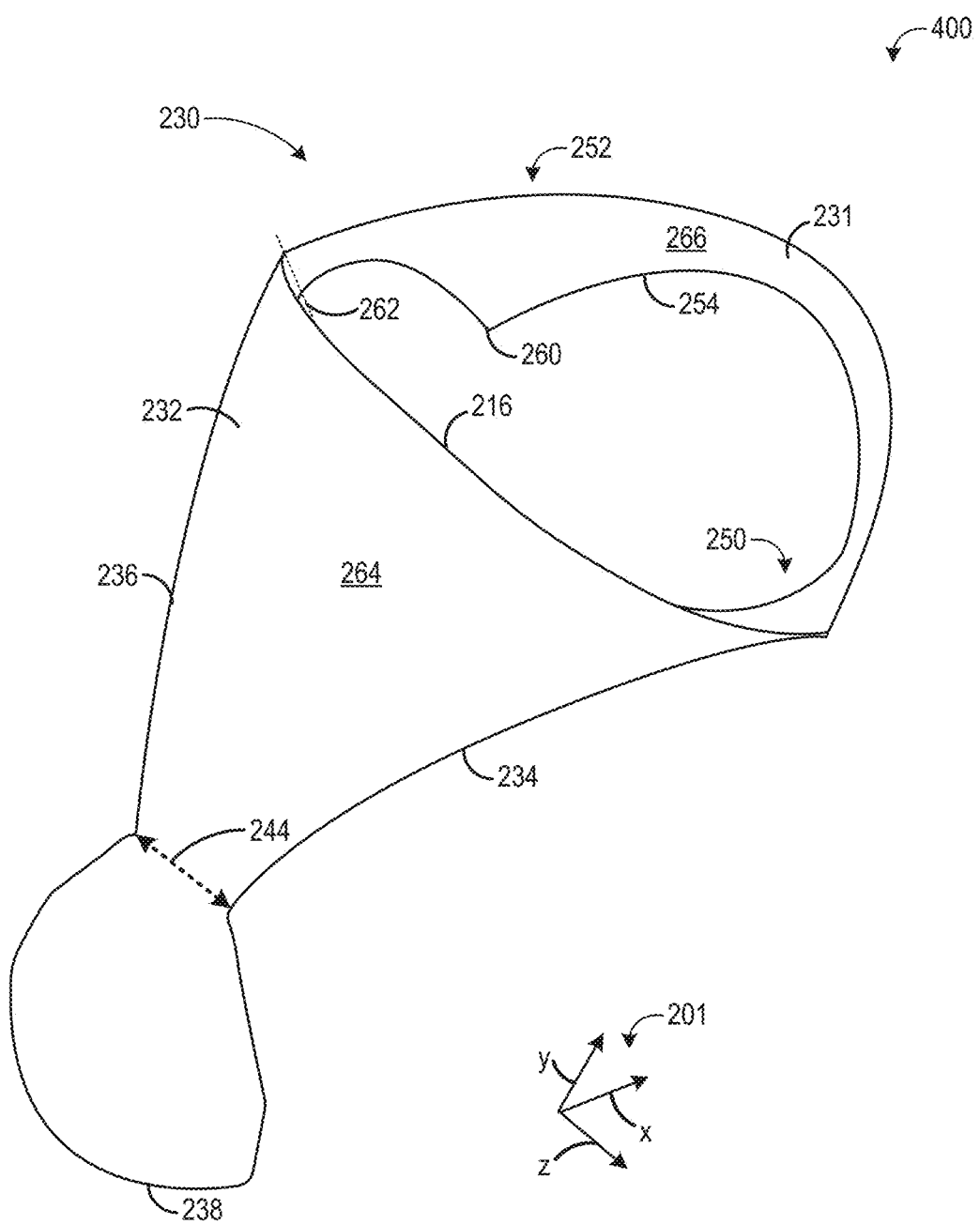
Figure 5:
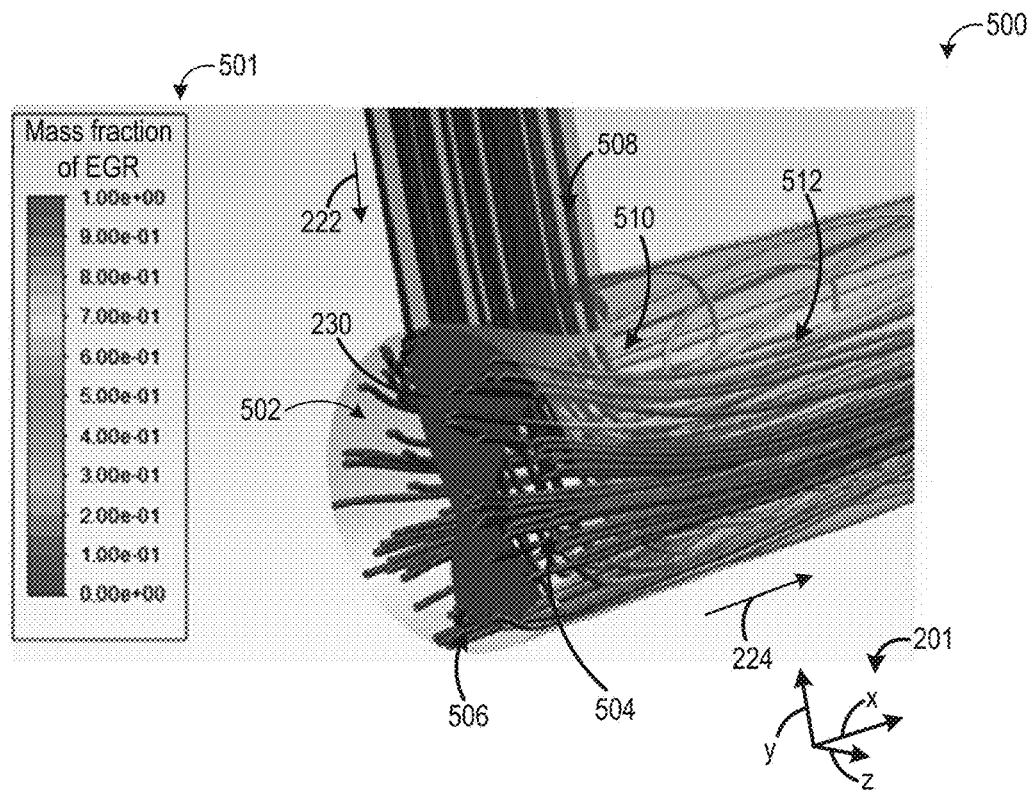
FIGS. 5-6 show perspective views of the EGR system of FIGS. 2-4 including schematic illustrations of streams of intake air and exhaust gas.
Figure 6:
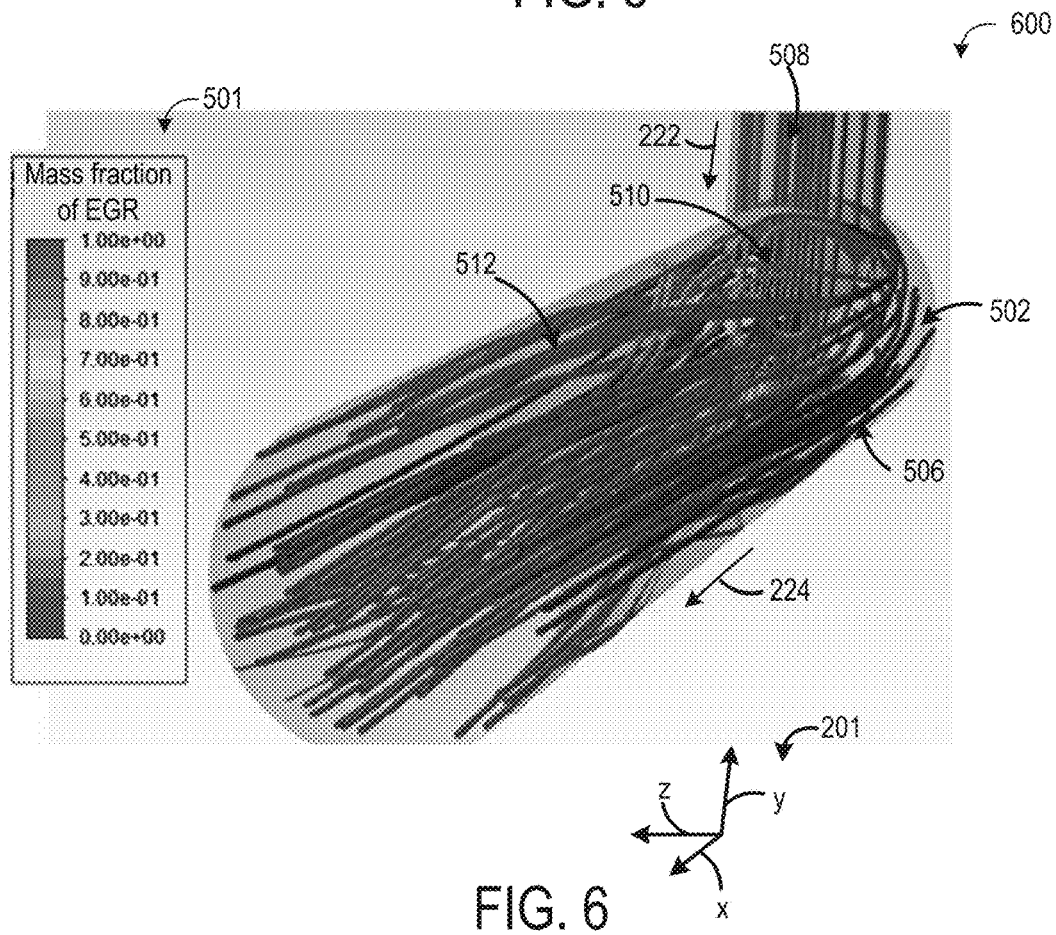
Figure 7:
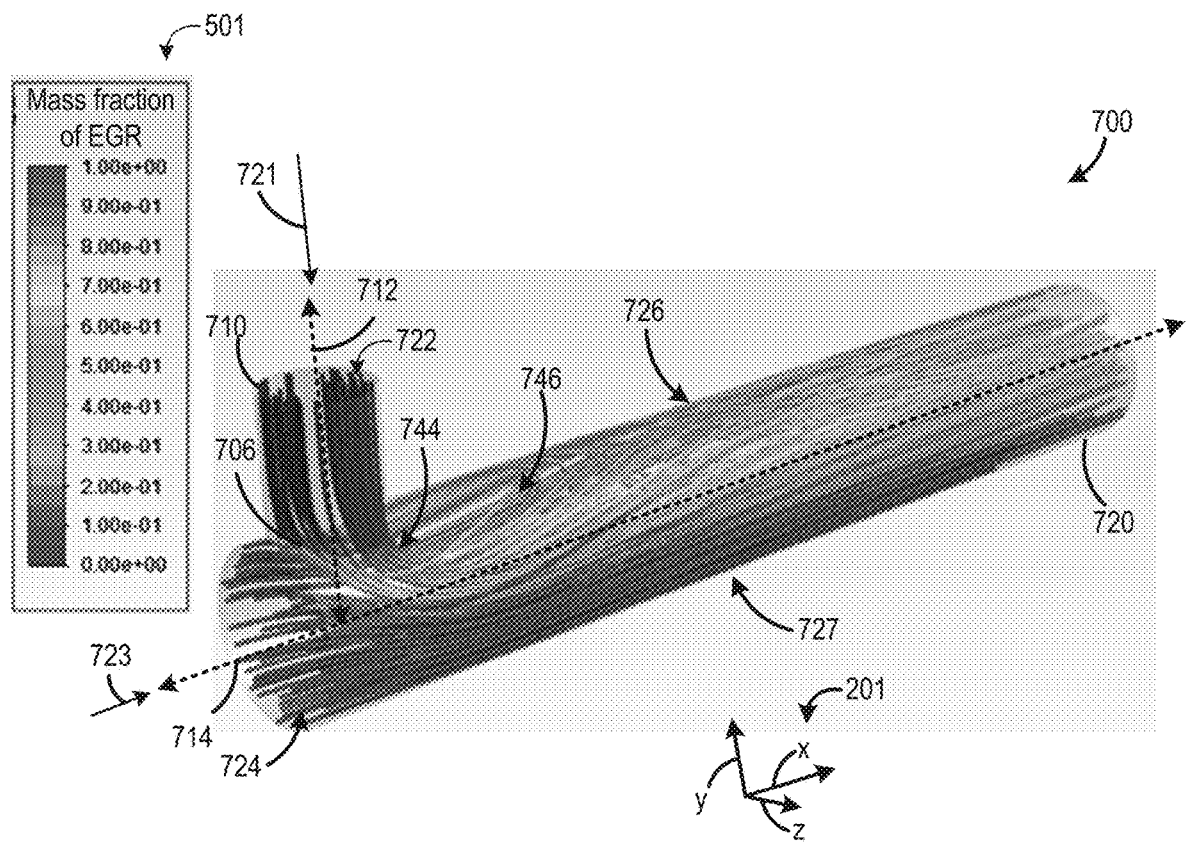
FIG. 7 shows a perspective view of an EGR system without a mixer including schematic illustrations of streams of intake air and exhaust gas.
Figure 8:
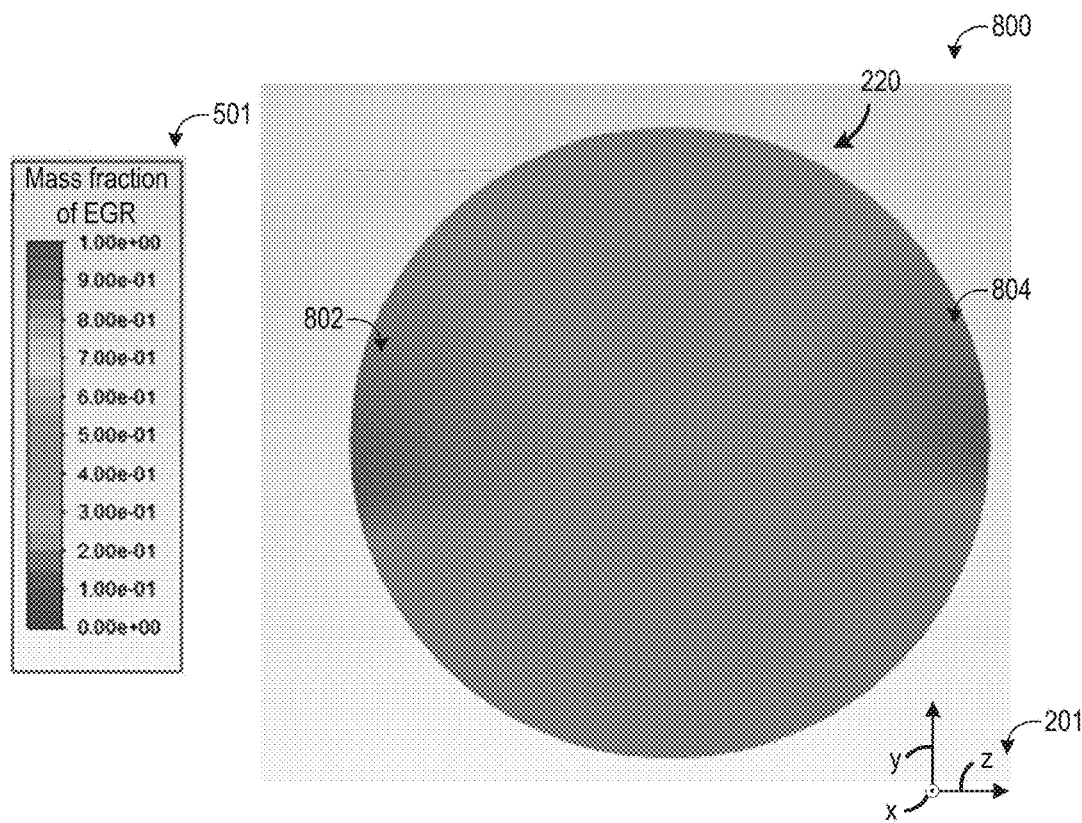
FIG. 8 shows a cross-section of the intake passage of the EGR system of FIGS. 5-6 including a schematic illustration of exhaust gas and intake air mixing.
Figure 9:
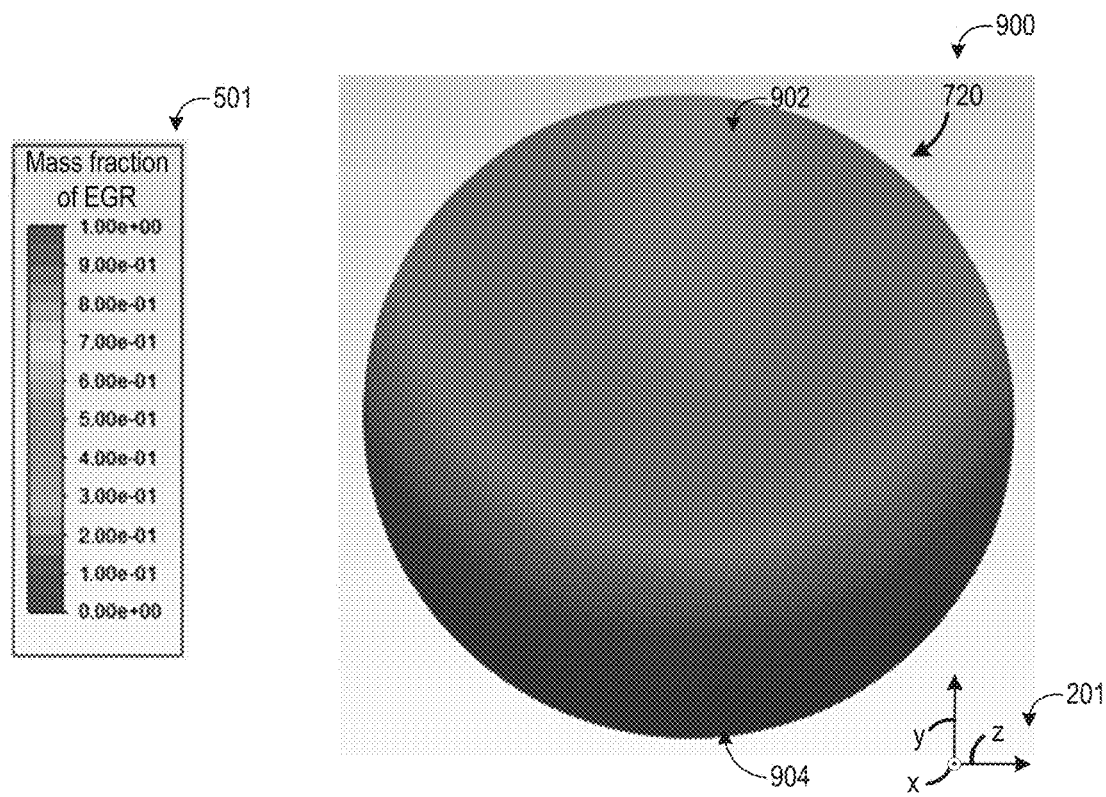
FIG. 9 shows a cross-section of the intake passage of the EGR system of FIG. 7 including a schematic illustration of exhaust gas and intake air mixing.

The following description relates to exhaust and air intake systems of a vehicle, such as the vehicle shown in FIG. 1. The exhaust system includes an exhaust gas recirculation (EGR) system for the flow of exhaust gasses from the exhaust of a combustion engine to the intake system of the combustion engine. The intake system may include an air intake to draw air from outside the vehicle and convey the intake air to the engine. The EGR system and the air intake system may include a fluid connection wherein the recirculated exhaust gas joins and flows into the intake air. A mixer coupled to the outlet of the EGR passage, as shown in FIGS. 2-4, is provided to thoroughly mix the EGR with the intake air. The mixer may comprise a wall extending into the intake passage, disposed on an upstream side of the EGR passage (e.g., at an upstream direction of the intake passage). The mixer thus acts as a partial barrier to the intake air, causing the intake air to flow around and below the mixer. The EGR flows down the mixer and is directed downstream along with the intake air. The intake air is mixed with the EGR when the intake air flows to the sides of the EGR. The mixer acts to spread the EGR over a greater volume within the intake passage, facilitating the fluid mixing of the EGR with the intake air, as shown in FIGS. 5, 6, and 8. The EGR is mixed with the intake air more thoroughly than similar systems without a mixer, as shown in FIGS. 7 and 9, while maintaining a 90° relationship between the EGR passage and the intake passage. Further, the mixer may be formed from the EGR passage, e.g., a segment of the EGR passage at the end of the EGR passage extending into the intake passage may be cut to form the mixer. By doing so, the mixer may be relatively inexpensive to manufacture.

Turning to FIG. 1, a schematic diagram of one cylinder of multi-cylinder engine 10, which may be included in a propulsion system of a vehicle 5, is shown. Vehicle 5 may be configured for on-road propulsion. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Exhaust manifold 48 may include a temperature sensor 72. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 coupled upstream of throttle 62 for measuring the flow rate of aircharge entering into the cylinder through throttle 62. Intake passage 42 may also include a manifold air pressure sensor 122 coupled downstream of throttle 62 for measuring manifold air pressure MAP.

In some embodiments, a compression device, such as a turbocharger or supercharger, including at least a compressor (not shown), may be arranged along intake manifold 44. For a turbocharger, the compressor may be at least partially driven by a turbine (not shown), for example via a shaft, the turbine arranged along exhaust manifold 48. For a supercharger, the compressor may be at least partially driven by the engine and/or an electric machine, and may not include a turbine.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a narrow band (older systems treat as a two-state device) oxygen sensor or EGO, a HEGO (heated EGO), a NOx, HC, or CO sensor. Emission control device 70 is shown arranged along exhaust passage 58 downstream of exhaust gas sensor 126. The emission control device 70 may be a three way catalyst (TWC), SCR catalyst, NOx trap, a gasoline particulate filter (GPF), a combination of two or more of these devices, or one of various other emission control devices.

Further, engine 10 may include an exhaust gas recirculation (EGR) system to help lower NOx and other emissions. The EGR system may be configured to recirculate a portion of exhaust gas from the engine exhaust to the engine intake. In one example, the EGR system may be a low pressure EGR system wherein exhaust gas is recirculated from downstream of gasoline particulate filter 70 to the engine intake. Thorough mixing of the EGR and intake air may facilitate even combustion, and thereby reduce emissions and increase fuel efficiency. Packaging constraints may demand that the EGR passage meet the intake passage 42 at a 90° angle. In the embodiment described below, a mixer may be provided to aid in mixing of exhaust gas and intake air.

The exhaust passage 58 may also include a muffler 71 and an active exhaust valve 75 (also referred to as an exhaust tuning valve) arranged downstream of the muffler 71. The exhaust passage 58 may also be referred to herein as an exhaust duct or exhaust pipe and may terminate at an exterior of the vehicle 5 as a (or coupled to) a tailpipe. The active exhaust valve 75 may be controlled via signals from controller 12 in order to provide desired f sound characteristics, as will be explained in more detail below.

The oxygen sensor(s) of vehicle 5 may be linear oxygen sensors or switching oxygen sensors. As an example, the oxygen sensors may be one of a UEGO sensor (universal or wide-range exhaust gas oxygen), a two-state oxygen sensor or EGO sensor, or a HEGO (heated EGO) sensor. Exhaust gas oxygen sensors 126 may assess a concentration of oxygen present in the exhaust gas and sense tailpipe exhaust oxygen concentrations about the emission control device 70. Exhaust gas sensor 126 may be a feed-gas oxygen sensor positioned upstream of emission control device 70 configured to sense feed-gas exhaust oxygen concentrations.

The air-fuel ratio of exhaust released from cylinders 30 may be determined by one or more of the oxygen sensors located in the exhaust stream of the engine. Based on the estimated exhaust air-fuel ratio, fuel injection to engine cylinders may be adjusted so as to control the air-fuel ratio of cylinder combustion. For example, fuel injection amounts to the cylinders may be adjusted based on a deviation of the exhaust air-fuel ratio, estimated based on the output of exhaust gas sensor 126 and a desired air-fuel ratio (such as a deviation from stoichiometry).

Vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 59 to provide torque to vehicle wheels 55. Electric machine 53 may also be operated as a generator to provide electrical power to charge battery 59, for example during a braking operation.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; exhaust temperature in the exhaust manifold from sensor 72, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device, for example to alert the driver of faults in the engine or exhaust system.

Storage medium read-only memory 106 can be programmed with computer readable data representing instructions executable by processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting fuel injection may include adjusting pulse width signal FPW to electronic driver 68 to adjust the amount of fuel injected to the cylinder via fuel injector 66.

Although the multi-cylinder engine 10 of FIG. 1 is shown as a diesel engine, engine 10 may instead be a gasoline, spark-ignited engine, a dual-fuel engine, or a multi-fuel engine, without departing from the scope of this disclosure.

FIGS. 2-4 show perspective views of an EGR system according to an embodiment of the disclosure. FIG. 2 shows a front/head-on view 200 of the EGR system 202, including an intake passage 220, an EGR passage 210, and a mixer 230. FIG. 3 shows a side view 300 of the intake passage 220, the EGR passage 210, and the mixer 230. FIG. 4 shows an isolated perspective view 400 of the mixer 230. FIGS. 2-4 each include a set of reference axes 201. The reference axes 201 includes a y axis that extends parallel to a direction of gravity, at least when the EGR system 202 is installed in a vehicle and the vehicle is sitting on flat ground. However, other orientations are possible without departing from the scope of this disclosure.

The EGR passage 210 may comprise a hollow passage (e.g. a pipe, a bore within a solid component, etc.) extending along a first axis 212 (shown in FIG. 3). In the example shown, the first axis 212 may extend parallel to the y axis of reference axes 201. Arrow 222 indicates a flow direction of EGR gases through the EGR passage 210, where the arrow 222 is arranged parallel with the first axis 212. An upstream side of the EGR passage 210 (e.g., an inlet end of the EGR passage 210) may be fluidly coupled to a source of exhaust gas (e.g., EGR passage 210 may be configured to receive exhaust gases from an exhaust manifold or exhaust passage at the upstream side), while a downstream side of the EGR passage 210 may be fluidly coupled with the intake passage 220 (e.g., EGR gases may flow from the downstream side through the EGR passage 210, out of an EGR outlet 206 and into the intake passage 220 at the upstream side). The EGR gases may flow in the direction of the first axis 212 along an inner circumferential surface 266 (e.g., inner perimeter) of the mixer 230 before turning (e.g., changing direction) and flowing in a direction of second axis 214 (shown in FIG. 3). The EGR outlet 206 fluidly couples to the intake passage 220 such that EGR gases may flow from the EGR outlet 206 into the intake passage 220. The EGR outlet 206 may comprise an opening 205 on an upper wall portion 207 of the intake passage 220 such that the EGR may flow into the intake passage 220 via the opening 205. EGR passage 210 is a non-limiting example of EGR passage 81 of FIG. 1.

The intake passage 220 may comprise a hollow passage (e.g. a pipe, a bore within a solid component, etc.) which may form a channel for gases (e.g., air) to flow through. The intake passage 220 may extend in the direction of the second axis 214. In the example shown, the second axis 214 extends parallel to the x axis of the reference axes 201. Arrow 224 indicates a flow direction of intake air through the intake passage 220, where the arrow 224 is arranged parallel with the second axis 214. The intake air flows into the intake passage 220 on an upstream end, flows around the mixer 230, and flows towards a downstream end of the intake passage 220 (e.g., which may terminate at an intake manifold, eventually leading to an engine, such as engine 10 shown by FIG. 1 and described above). Intake passage 220 is a non-limiting example of intake passage 42 of FIG. 1.

The EGR passage 210 and intake passage 220 are shown coupling at an angle α. In some examples, the EGR passage 210 may be joined to the intake passage 220 such that the angle α is 90°, as shown in FIG. 3. However, in other examples, the angle α may be a different number of degrees (e.g., the EGR passage 210 may meet the intake passage 220 at an angle of 95°, 85°, etc.). As explained previously, in configurations in which the angle α is 90°, the angled junction of the EGR passage and intake passage may cause inhomogeneous distribution of the EGR in the intake passage, leading to varying levels of EGR at the cylinders that can compromise combustion stability and/or emissions control in some cylinders.

Thus, the EGR passage 210 described herein includes an integrated mixer, referred to herein as the mixer 230, that extends from the EGR passage 210 into the intake passage 220. The mixer 230 may increase a likelihood of turbulence and/or disruption of the flow of intake air through the intake passage 220 while directing the EGR gases toward the center of the intake passage 220, thus promoting mixing of the EGR gases and the intake air downstream of the mixer 230. The mixer 230 may include an extension 231 that is coupled to and extends from the EGR passage 210 and a main body 232 extending vertically from the extension 231. The extension 231 may extend radially around the first axis 212 and may extend vertically along the first axis 212.

In some examples, the mixer 230 may be continuous with the EGR passage 210, such that no seams or joints are present between the mixer 230 and the EGR passage 210 (e.g., the EGR passage 210 and the mixer 230 may be continuous). For example, the mixer 230 and EGR passage 210 may be formed together as a single, unitary piece (e.g., molded together). In other examples, the mixer 230 may be formed at least partially separately from the EGR passage 210 and may be coupled to the EGR passage 210 via welding or other suitable coupling mechanism.

In the example shown in FIGS. 2-4, the mixer 230 and the EGR passage 210 may share an edge that forms a top circumferential edge 216 of the mixer 230. In some examples, the top circumferential edge 216 may extend along an entirety of the circumference of the EGR passage 210, such that the mixer 230 is in contact with the EGR passage around the entirety of the circumference of the EGR passage. In other examples, the top circumferential edge 216 may only extend partially along the circumference of the EGR passage 210.

The mixer 230 may include an outer surface 264 and the inner surface 266. The outer surface 264 may be continuous with an outer surface of the EGR passage 210 and the inner surface 266 may be continuous with an inner surface of the EGR passage 210. The outer surface 264 and the inner surface 266 may each extend continuously around the first axis 212 along the extension 231.

The main body 232 may extend outward (e.g., vertically downward) from the EGR outlet 206 towards a lower side 227 of the intake passage 220, but may not contact the lower side 227 of the intake passage 220. The main body 232 has a front surface area (formed by the outer surface 264) and a rear surface area (formed by the inner surface 266) each bounded by a first edge 234, a second edge 236 opposite the first edge 234, a bottom edge 238, and the EGR outlet 206/top circumferential edge 216. The bottom edge 238 extends from the first edge 234 to the second edge 236, forming a bottom terminal edge of the main body 232. Thus, a gap may be formed between a bottom wall portion 209 of the intake passage 220 and the bottom edge 238. The intake passage 220 may have an inner diameter D1 that extends from an inner side of the upper wall portion 207 to an inner side of the bottom wall portion 209 parallel to the first axis 212 (e.g., vertically along the y axis). The gap may have a shortest length G1 (extending from the bottom-most point of the bottom edge 238 to the inner side of the bottom wall portion 209) that is a portion of the inner diameter D1, e.g., the length G1 of the gap may be in a range of 20-30% of the inner diameter D1.

The main body 232 may have an asymmetric hour-glass shape formed by an upper tapered portion 240 and a lower tapered portion 242. For example, the central longitudinal axis 235 may form an axis of symmetry for the main body 232, but the main body 232 may not have an axis symmetry orthogonal to the central longitudinal axis 235 at any point along the main body 232. The upper tapered portion 240 may decrease in width from the top circumferential edge 216 to a midline 244, such that the first edge 234 and the second edge 236 each angle inward along the upper tapered portion 240. The first edge 234 and the second edge 236 may each angle inward (e.g., toward each other, in a direction of a central longitudinal axis 235 of the main body 232) along the upper tapered portion 240 at the same angle. In the example shown in FIGS. 2-4, the first edge 234 and the second edge 236 may each extend inward at an angle of 30° relative to the central longitudinal axis 235 of the main body 232 along the upper tapered portion 240. Due to the curvature of main body 232 (explained in more detail below), the first edge 234 and the second edge 236 may not extend at a constant angle along the upper tapered portion 240. Rather, the first edge 234 and the second edge 236 may extend along the upper tapered portion 240 with a concave curvature. For example, as shown in FIG. 3, the first edge 234 may curve from a first point 256 to the midline 244, curving in a direction toward the EGR passage 210 and the upstream side of the intake passage 220 and away from the center of the intake passage 220 and the downstream end of the intake passage 220.

The lower tapered portion 242 may increase in width from the midline 244 to the bottom edge 238, such that the first edge 234 and the second edge 236 each angle outward (e.g., away from each other) along the lower tapered portion 242 (e.g., portions of the first edge 234 and second edge 236 arranged proximate to the bottom edge 238 are spaced further apart from each other relative to portions of the first edge 234 and second edge 236 arranged further away from the bottom edge 238). The first edge 234 and the second edge 236 may each angle outward along the lower tapered portion 242 at the same angle. In the example shown in FIGS. 2-4, the first edge 234 and the second edge 236 may each extend outward at an angle of 30° relative to the central longitudinal axis 235 of the main body 232 along the lower tapered portion 242 for a portion of the lower tapered portion 242, and then the first edge 234 and the second edge 236 may transition to extend outward at a second, different angle (e.g., 10°) until the edges terminate at the bottom edge 238. The bottom edge 238 may not be flat but instead may have a concave curvature (e.g., curved in a direction away from the EGR passage 210 and toward the lower side 227 of the intake passage 220).

Thus, the midline 244 may represent the region of the outer surface 264 at the main body 232 having the narrowest width. As appreciated from FIG. 2, the upper tapered portion 240 may be longer than the lower tapered portion 242, such that the midline 244 is positioned closer to the bottom edge 238 than the top circumferential edge 216. In one example, the main body 232 may have a length L1 extending from the top circumferential edge 216 to the bottom edge 238 and aligned with the central longitudinal axis 235, and the upper tapered portion 240 may have a length that is in a range of 60-75% of the length L1 and the lower tapered portion 242 may have a length that is in a range of 25-40% of the length L1.

The main body 232 may therefore divert the flow of intake air through the intake passage 220 where the EGR is introduced. The main body 232 may preferentially block intake air flow at a top side 226 of the intake passage relative to intake air flow at the lower side 227 of the intake passage, while allowing relatively equal intake air flow along the lateral sides 228, 229 of the intake passage.

As described above, the mixer 230 may comprise an extension of the EGR passage 210 with cut-outs to form the main body 232 and the radial extension 231. For example, the mixer 230 may be formed from the EGR passage 210 during manufacturing of the EGR passage 210 via cutting, stamping, and/or other machining. Accordingly, the main body 232 may have an overall curvature that matches the curvature of the EGR passage 210. For example, the outer surface 264 and inner surface 266 at the main body 232 may have a concave curvature, such that a top radial width 246 of the main body 232 (which may be the widest portion of the main body 232) may have a radius of curvature that is the same as the radius of curvature of one or more segments of the EGR passage 210. Likewise, a bottom radial width 248 of the main body 232 (which may be the widest portion of the lower tapered portion 242) may have the same radius of curvature of the top radial width 246. Further, the first edge 234 and the second edge 236 are not straight edges but rather the first edge 234 and the second edge 236 each curve along the y axis (e.g., curving from the top circumferential edge toward the midline 244 and then curving away from the midline 244 toward the bottom edge 238 thus forming the tapered portions of the main body 232 as described above and shown in FIG. 2) and along the x axis (e.g., curving from the midline 244 to the first point 256 or a fourth point 262 toward the EGR passage 210 as shown in FIG. 3).

The extension 231 may extend radially around the first axis 212 and may include a plurality of structures extending vertically downward (e.g., toward the interior of the intake passage 220), including the main body 232, a first corner region 250, and a second corner region 252. The extension 231 may include a radial bottom edge 254 that extends continuously from the first edge 234 to the second edge 236 and that forms a first corner 258 at the first corner region 250 and a second corner 260 at the second corner region 252. The radial bottom edge 254 may include a plurality of concave regions. For example, the radial bottom edge 254 may curve from the first point 256 to the first corner 258 with a first radius of curvature, curve from the first corner 258 to the second corner 260 with the first radius of curvature, and curve from the second corner 260 to the fourth point 262 with the first radius of curvature. The first point 256 may serve as a boundary between the first edge 234 and the radial bottom edge 254 and the fourth point 262 may serve as a boundary between the second edge 236 and the radial bottom edge 254. However, the radial bottom edge 254, the first edge 234, and the second edge 236 are continuous with each other and thus the first point 256 and the fourth point 262 are included herein to aid in explanation of the curvature of the bottom radial edge 254, and it is to be appreciated that the boundaries between the radial bottom edge 254 and the first edge 234 and second edge 236 may be positioned elsewhere in other examples.

The extension 231 may have a second length L2 extending from the top circumferential edge 216 to the radial bottom edge 254, which may be the minimum length of the radial extension 231. The radial extension 231 may have a third length L3 extending from the top circumferential edge 216 to the radial bottom edge 254 at the first corner 258 and at the second corner 260, which may be a maximum length of the extension 231. In some examples, the third length L3 may be twice as long as the second length L2, although other relative dimensions are possible. Further, the overall length of the main body 232 (the first length L1) may be at least five times as long as the third length L3. In some examples, the bottom radial edge of the extension, at the first corner and the second corner, forms an angle in a range of 90-100 degrees. Additionally, the main body 232, the first corner 258, and the second corner 260 may be evenly spaced apart around the circumference of the top circumferential edge 216 and/or outlet 206. For example, the central longitudinal axis 235 may be located at a first position relative to the outlet 206, the first corner 258 may be located at a second position relative to the outlet 206, and the second corner 260 may be located at a third position relative to the outlet 206, and the first position may be spaced apart from the second position and the third position by an equal amount (e.g., the first position may be at 0°, the second position be at 120°, and the third position may be at 240°).

In some examples, the main body 232 may be formed of a first sheet of material (e.g., aluminum, stainless steel, etc.) and the extension 231 may be formed of a second sheet of the material coupled to the first sheet, and each of the first sheet and the second sheet may be curved with a common radius of curvature around the first axis 212. In such examples, the first edge 234, the second edge 236, and the bottom terminal edge 238 are edges of the first sheet, and the bottom radial edge 254 is an edge of the second sheet. Further, a first top edge of the first sheet and a second top edge of second sheet collectively form the top circumferential edge 216 of the mixer. The first sheet and the second sheet may be coupled together, and the top circumferential edge 216 may be coupled to the EGR passage, in a suitable manner, e.g., welded. In such examples, the first sheet and the second sheet each have a thickness in a range of 1-2 mm. In another example, the first and second sheets can be an integrated as one piece which is made from a cylindrical tube by removing unwanted portions on the in the back and both sides, thereby forming the main body and extension. For example, the main body and extension may be formed by removing portions of an end of the tube/pipe forming the EGR passage. In either example, the interior of the mixer is completely hollow, such that the interior of the EGR passage is continuous with the interior of the mixer, and the inner surface 266 of the mixer curves around the first axis in a manner that corresponds to the curvature of the outer surface 264.

The extension 231 may direct EGR downward, toward the middle of the intake passage 220, and reduce a likelihood of EGR from dispersing at the top of the intake passage 220. Further, the first corner region 250 and the second corner region 252 may help direct the EGR toward the middle of the intake passage 220 and away from the lateral edges of the intake passage 220, generating flow turbulence behind the mixer for better mixing. Longer corner regions may promote better flow mixing, but may add additional back pressure for intake air.

The main body 232 may divert the intake air into split air streams. For example, the main body 232 may divert the intake air into three separate air streams, a first stream on a first lateral side 228 of the intake passage 220, a second stream on a second lateral side 229 of the intake passage 220, and a third air stream below the mixer 230, on the lower side 227 of the intake passage 220. The mixer 230 may restrict flow of intake air along a top side 226 of the intake passage 220. Due to the hourglass shape of the mixer 230 and the mixer 230 being wider at the top of the mixer than at the bottom of the mixer, a higher proportion of intake air may flow along the lower side 227 of the intake passage 220 than along the top side 226 of the intake passage 220 in the area surrounding the mixer 230. This restriction of the intake air flow may facilitate the flow of EGR down the mixer 230 and into the central portion of the intake passage 220, which may improve mixing of the EGR and intake air. Further, the hourglass shape of the main body 232 may still allow adequate flow of intake air through the intake passage 220. Another effect from the hourglass shape of the main body is that it creates four recirculation flows behind the mixer, with two on each side. Due to hourglass shape, flow resistance for the intake air is smaller on both sides of the main body close to midline 244. The majority of the intake air will flow across those two regions. Taking the first lateral side 228 as an example, right after passing the second edge 236 of the main body, intake air tends to flow upwards towards the upper back of the main body on the top side (e.g., towards the inner surface 266 near the top circumferential edge 216) and downwards towards the lower back of main body on the bottom side (e.g., towards the inner surface 266 near the bottom edge 238). At the same time, a portion of EGR exits from the back of the main body at the location close to the midline 244. The intake air takes the EGR and spreads the EGR across from the center to the upper and bottom sides of the intake passage. A similar flow of intake air and spreading of the EGR occurs on the second lateral side 229.

The diversion of intake air around the mixer 230 may allow for the improved mixing of EGR and intake air by allowing the EGR to flow a farther distance along the first axis 212 before being carried by the intake air further downstream along the second axis 214.

In some examples, the outer surface 264 and/or the inner surface 266 may comprise various voids and/or may have smooth or irregular textures. The outer surface 264 may comprise a different surface texture than the inner surface 266, or the outer surface 264 and the inner surface 266 may have the same surface texture. For example, the inner surface 266 may be smooth, having no channels or protrusions or depressions on the surface, or the inner surface 266 may have protrusions and/or depressions on the surface. As a further example, the outer surface 264 may be smooth, or it may have protrusions or depressions. In some examples, these depressions may extend through the mixer to the other side (e.g. from the outer surface to the inner surface) to form voids in the mixer 230. The texture or voids may be provided to achieve a desired flow pattern of the EGR or the intake air.

FIGS. 5-6 schematically show example gas streams flowing through the EGR system 202 described above. FIG. 5 shows a front view 500 of the intake passage 220, EGR passage 210, and mixer 230 (e.g., from the upstream end of the intake passage 220). FIG. 6 shows a rear view 600 of the intake passage 220, EGR passage 210, and mixer 230 (e.g., from the downstream end of the intake passage 220).

Gas paths and gas mixing in the EGR system 202 are simulated and shown in FIGS. 5-6. The color of a given stream corresponds to the fraction of the total mass of gas in that stream which is EGR, as shown by the legend 501.

As the intake air flows downstream through the intake passage 220, the EGR may fluidly mix with the intake air; thus the color of the stream may change from the upstream end to the downstream end of the stream.

The simulations shown in FIGS. 5-6 show gas flow with the mass of intake air equal to the mass of EGR or slightly larger than the mass of EGR (e.g., EGR may comprise 40% of the total fraction of gas flowing through the intake passage, downstream of the EGR passage). Red indicates streams which are composed entirely of EGR. The fraction of the total mass which is EGR may be 1.0, or 100%. There may be substantially only EGR flowing into the intake passage 220 from the EGR outlet 206. Orange to yellow indicates 0.9 (90%) to 0.7 (70%) EGR in the total mass of the stream. Green indicates a mass fraction of EGR between 0.6 (60%) and 0.4 (40%) in the total mass of the stream. The range of light blue may indicate a mass fraction of between 0.4 (40%) and 0.2 (20%) EGR. Blue to dark blue may indicate 0.2 (20%) to 0.0 (0.0%) EGR. Dark blue indicates a stream which is entirely comprised of intake air.

The streams are diverted by the mixer 230. A first stream 502 of the intake air may be diverted to the first lateral side 228 of the mixer 230, while a second stream 504 of the intake air may be diverted to the second lateral side 229. A third stream 506 may be diverted towards the lower side 227 of the intake passage 220, under the mixer 230.

The first stream 502, the second stream 504, and the third stream 506 may each comprise a portion of the total intake air flowing through the intake passage. As one example, 40% of the intake air may flow in the first stream 502 along the first lateral side 228 of the mixer while 40% of the intake air may flow in the second stream 504 and 20% of the intake air may flow in the third stream 506.

A fourth stream 508 may flow along the first axis 212 and out of the EGR outlet 206. Within the EGR passage, the fourth stream 508 may be comprised entirely of EGR. The fourth stream 508 may flow along the first axis 212 into the intake passage 220 to a first region 510 positioned vertically below the EGR outlet. The velocity of the EGR flow may carry the EGR variable distances along the first axis 212. EGR with high velocity may flow to the lower side 227, while the EGR with low velocity may flow a shorter distance along the first axis 212. The fourth stream 508 may substantially change direction and may flow along the second axis 214. Along its path in the intake passage, the fourth stream 508 may mix with the intake air.

The intake air in the first stream 502, second stream 504, and third stream 506 may flow along with the fourth stream 508 along the second axis. At a second region 512 downstream of the EGR outlet/mixer 230, the EGR is substantially mixed with the intake air, shown by the streams having an EGR mass fraction between 10% EGR and 50% EGR. Thus, at the mixer 230, the EGR and intake air may be nearly fully unmixed (e.g., streams of 100% EGR and streams of 100% intake air may meet at the mixer), but even a small distance downstream (e.g., at the second region 512, which may be a suitable distance downstream of the mixer 230, such as a distance that is in the range of 1-2 times the diameter of the intake passage) of the mixer 230, the EGR may be substantially mixed with the intake air. For example, at the second region 512, the streams (e.g., the fourth stream 508) previously comprised of 100% EGR may be comprised of 50% EGR. Further, the EGR may be more homogenously distributed, such that EGR is present in streams at the top, middle, and bottom of the intake passage.

FIG. 7 schematically shows example gas streams flowing through an EGR system, which may be similar to the EGR system 202 shown in FIGS. 2-4, but without a mixer present. FIG. 7 shows a view 700 of the intake passage 720 and an EGR passage 710, and from the upstream side of the intake passage 720. Flow of EGR through the EGR passage 710 is in the direction shown by arrow 721 and flow of intake air through the intake passage 720 is in the direction shown by arrow 723. FIG. 7 includes the legend 501.

The color of a given stream corresponds to the fraction of the total mass of air in that stream which is EGR. The air is simulated and represented in discrete streams. Each stream shows the fraction of air in the stream which is composed of EGR.

As the gas flows downstream through the intake passage 720, the EGR may fluidly mix with the intake air; thus the color of the stream may change from the upstream end to the downstream end of stream as the mass fraction of EGR within the stream changes.

A first stream 722, comprised substantially entirely of EGR in the EGR passage, may flow through the EGR passage 710 and into the intake passage 720 along a first axis 712, as shown simulated in FIG. 7. The velocity of the EGR may carry the EGR only a short distance along the first axis 712. The first stream 722 may flow towards the bottom of the intake passage 720 and perpendicular to the direction of the flow of intake air along a second axis 714 (e.g., downwards or aligned with the y axis) before being carried along and parallel to the second axis 714.

A second stream 724 may flow into the intake passage 720 along the second axis 714. The second stream 724 may not be diverted around any obstructions in the intake passage 720 because the EGR passage 710 in FIG. 7 may not contain a mixer extending into the intake passage 720.

The EGR flows in the direction of the first axis 712 a short distance into the intake passage 720, but remains substantially concentrated in an upper portion 726 of the intake passage 720.

At a first region 744, which may be vertically below the EGR outlet, the EGR may flow substantially or only in the direction of the second axis 714, and very little in the direction of the first axis 712. At a second region 746, which may be downstream of the EGR outlet a similar distance as the second region 512 of FIG. 5, the EGR has flowed downstream with the first stream 722, but is primarily concentrated in the upper portion 726 of the intake passage 720. For example, the EGR mass fraction at the second region 746 may range from 70% EGR near the upper portion 726 of the intake passage 720 to 0% EGR near a lower portion 727 of the EGR passage. The lower portion 727 of the intake passage 720 may remain at a mass fraction of 0.2 or less (e.g., 0-20% EGR) along the entirety of the portion of the intake passage 720 shown in FIG. 7.

FIG. 8 schematically shows a cross section 800 of the intake passage 220, showing the mixing of EGR and intake air at an area of the intake passage 220 downstream of the mixer 230. The color across the intake passage 220 is overall uniform, with only two areas of variation on the lateral sides of the intake passage 220. For example, the mass fraction of EGR in the intake passage 220 as shown in FIG. 8 may be approximately 40% to 50% EGR, other than at area 802 and area 804, which may each have a mass fraction of EGR that is closer to 20% EGR.

The mixing of the intake air and the EGR may be represented by a mixing index (also referred to as a uniformity index), which may be a value in a range of 0 to 1, where 0 indicates no mixing and 1 indicates full mixing. The highly homogenous EGR distribution shown in FIG. 8 may result in a mixing index of 0.91, which may be above a mixing index threshold (e.g., of 0.9) that may provide desired performance.

FIG. 9 shows a cross section 900 of the intake passage 720 without a mixer included at the EGR outlet 706 showing the mixing of EGR and intake air at an area of the intake passage 720 downstream of the EGR outlet. The EGR fraction in intake passage 720 may range from around 60-70% EGR at a first region 902 near the top of the intake passage to substantially no EGR at a second region 904 at the bottom of the intake passage. The inhomogeneous distribution of the EGR may result in a mixing index of 0.78, below the mixing index threshold. Thus, without the mixer described herein, EGR mixing may be inadequate and result in combustion issues and/or insufficient emissions control.

The disclosure also provides support for a gas flow system for an engine, comprising: a first passage through which a first gas is configured to flow along a first axis, a second passage through which a second gas is configured to flow along a second axis, the first passage fluidly coupled to the second passage at an outlet of the first passage, and a mixer coupled to the first passage at the outlet and extending into the second passage, the mixer including an extension extending radially around the first axis and a main body extending into the second passage along the first axis. In a first example of the system, the second passage has a diameter and the main body has a length extending from the outlet of the first passage to a bottom terminal edge of the main body, and wherein the length is in a range of 70-80% of the diameter. In a second example of the system, optionally including the first example, the main body includes a first edge and a second edge opposite the first edge, each of the first edge and the second edge extending from the extension to a bottom terminal edge of the main body. In a third example of the system, optionally including one or both of the first and second examples, the main body includes an upper tapered portion and a lower tapered portion formed by the first edge and the second edge, wherein the first edge and the second edge each taper inward toward a central longitudinal axis of the main body from the extension to a midline to form the upper tapered portion and the first edge and the second edge each taper outward away from the central longitudinal axis of the main body from the midline to the bottom terminal edge to form the lower tapered portion. In a fourth example of the system, optionally including one or more or each of the first through third examples, the main body has an overall length extending from the outlet of the first passage to the bottom terminal edge of the main body and the upper tapered portion has a first length extending from the outlet of the first passage to the midline, and wherein the first length is in a range of 60-75% of the overall length. In a fifth example of the system, optionally including one or more or each of the first through fourth examples, the extension comprises a bottom radial edge that extends continuously from the first edge to the second edge, the bottom radial edge curving in a concave manner to form a first corner and a second corner of the extension. In a sixth example of the system, optionally including one or more or each of the first through fifth examples, the main body is formed of a first sheet of material and the extension is formed of a second sheet of material coupled to the first sheet, wherein each of the first sheet and the second sheet are curved with a common radius of curvature around the first axis, wherein the first edge, the second edge, and the bottom terminal edge are edges of the first sheet, and the bottom radial edge is an edge of the second sheet, and wherein a first top edge of the first sheet and a second top edge of second sheet collectively form a top circumferential edge of the mixer, the top circumferential edge coupled to the first passage. In a seventh example of the system, optionally including one or more or each of the first through sixth examples, the first sheet and the second sheet each have a thickness in a range of 1-2 mm. In an eighth example of the system, optionally including one or more or each of the first through seventh examples, the main body and the extension are integrated and formed from a common piece of material, wherein the common piece of material is curved with a radius of curvature around the first axis, and wherein a first top edge of the main body and a second top edge of the extension collectively form a top circumferential edge of the mixer, the top circumferential edge coupled to the first passage. In a ninth example of the system, optionally including one or more or each of the first through eighth examples, the extension has a second length extending from the outlet of the first passage to the bottom radial edge at a location intermediate the main body and the first corner and has a third length extending from the outlet of the first passage to the bottom radial edge at the first corner, wherein the second length is a minimum length of the extension and the third length is a maximum length of the extension, and wherein the third length is at least twice as long as the second length. In a tenth example of the system, optionally including one or more or each of the first through ninth examples, the central longitudinal axis of the main body is positioned at a first position relative to the outlet of the first passage, the first corner is positioned at a second position relative to the outlet of the first passage, and the second corner is positioned at a third position relative to the outlet of the first passage, wherein the first position, the second position, and the third position are spaced evenly apart around a circumference of the outlet of the first passage. In an eleventh example of the system, optionally including one or more or each of the first through tenth examples, the first gas is exhaust gas and the second gas is intake air, and wherein the first axis is perpendicular to the second axis. In a twelfth example of the system, optionally including one or more or each of the first through eleventh examples, the main body is configured to block a flow of the second gas along a top side and a center of the second passage, causing the second gas to flow around the main body along a bottom side of the second passage and each lateral side of the second passage. In a thirteenth example of the system, optionally including one or more or each of the first through twelfth examples, the main body and the extension are configured to direct the first gas to the center of the second passage along the first axis.

The disclosure also provides support for a system for an engine, comprising: an exhaust gas recirculation (EGR) passage through which exhaust gas from the engine is configured to flow along a first axis, an intake passage through which intake air en route to the engine is configured to flow along a second axis, the EGR passage fluidly coupled to the intake passage at an outlet of the EGR passage, and a mixer coupled to the EGR passage at the outlet and extending into the intake passage, the mixer including a main body extending along the first axis, the main body having an asymmetric hourglass shape and terminating vertically above a bottom side of the intake passage, the main body is configured to block a flow of the intake air along a top side and a center of the intake passage, causing the intake air to flow around the main body along the bottom side of the intake passage and each lateral side of the intake passage. In a first example of the system, the main body comprises a sheet of material curving around the first axis with a radius of curvature that is equal to a radius of curvature of the EGR passage, wherein the sheet of material has a first edge, a second edge opposite the first edge, and a bottom edge extending from the first edge to the second edge, and wherein the asymmetric hourglass shape is formed by the first edge and the second edge tapering inward toward a central longitudinal axis of the main body from a top of the main body to a midline of the main body and tapering outward away from the central longitudinal axis from the midline to the bottom edge, and wherein the midline is positioned closer to the bottom edge than the top of the main body. In a second example of the system, optionally including the first example, the mixer further includes an extension coupled to the main body and having a bottom radial edge extending from the first edge to the second edge, the extension curving around the first axis with the same radius of curvature as the main body, the bottom radial edge having a first corner and a second corner. In a third example of the system, optionally including one or both of the first and second examples, the extension has a maximum length at the first corner and at the second corner, wherein the main body has an overall length along the central longitudinal axis, and wherein the overall length of the main body is at least five times as long as the maximum length of the extension.

The disclosure also provides support for a method, comprising: flowing exhaust gas through an exhaust gas recirculation (EGR) passage along a first axis, flowing intake air through an intake passage along a second axis, perpendicular to the first axis, and mixing the exhaust gas with the intake air via a mixer coupled to the EGR passage and extending into the intake passage, including directing the intake air to flow, via the mixer, along a first lateral side of the intake passage, a second lateral side of the intake passage, and a bottom of the intake passage and blocking the intake air from flowing along a top of the intake passage, and directing the exhaust gas to flow, via the mixer, to a center of the intake passage. In first example of the method, blocking the intake air from flowing along a top of the intake passage includes blocking the intake air from flowing along a top of the intake passage at the mixer, where the EGR passage fluidly couples to the intake passage. In a second example of the method, optionally including the first example, the mixer includes a main body extending into the intake passage along the first axis, and wherein directing the intake air to flow, via the mixer, along the first lateral side of the intake passage, the second lateral side of the intake passage, and the bottom of the intake passage comprises directing a first portion of intake air to flow along the first lateral side of the intake passage at a midline of the main body of the mixer and directing a second portion of intake air to flow along the second lateral side of the intake passage at the midline of the main body of the mixer, the midline of the main body of the mixer having a narrowest width of the main body. In a third example of the method, optionally including one or both of the first and second examples, directing the exhaust gas to flow, via the mixer, to the center of the intake passage comprises directing the exhaust gas to flow through a hollow opening of the mixer formed by the main body and an extension coupled to the main body. In a fourth example of the method, optionally including one or more or each of the first through third examples, directing the exhaust gas to flow through the hollow opening of the mixer formed by the main body and the extension comprises directing the exhaust gas to flow downward along the first axis toward the center of the intake passage via the main body, a first corner of the extension, and a second corner of the extension, and wherein the intake air flowing along the first lateral side of the intake passage, the second lateral side of the intake passage, and the bottom of the intake passage, after flowing past the main body of the mixer, mixes with the exhaust gas at the center of the intake passage and spreads the exhaust gas toward the top and the bottom of the intake passage.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gas flow system for an engine, comprising:
    a first passage through which a first gas is configured to flow along a first axis;
    a second passage through which a second gas is configured to flow along a second axis, the first passage fluidly coupled to the second passage at an outlet of the first passage; and
    a mixer coupled to the first passage at the outlet and extending into the second passage, the mixer including an extension extending radially around the first axis and a main body extending into the second passage along the first axis, the main body comprising a first edge and a second edge opposite the first edge, and the first edge and the second edge each taper inward toward a central longitudinal axis of the main body to form an upper tapered portion and a lower tapered portion of the main body.

2. The gas flow system of claim 1, wherein the second passage has a diameter and the main body has a length extending from the outlet of the first passage to a bottom terminal edge of the main body, and wherein the length is in a range of 70-80% of the diameter.

3. The gas flow system of claim 1, wherein the first edge and the second edge extend from the extension to a bottom terminal edge of the main body.

4. The gas flow system of claim 3, wherein the first edge and the second edge each taper inward toward the central longitudinal axis of the main body from the extension to a midline to form the upper tapered portion, and the first edge and the second edge each taper outward away from the central longitudinal axis of the main body from the midline to the bottom terminal edge to form the lower tapered portion.

5. The gas flow system of claim 1, wherein the main body has an overall length extending from the outlet of the first passage to the bottom terminal edge of the main body and the upper tapered portion has a first length extending from the outlet of the first passage to the midline, and wherein the first length is in a range of 60-75% of the overall length.

6. The gas flow system of claim 1, wherein the extension comprises a bottom radial edge that extends continuously from the first edge to the second edge, the bottom radial edge curving in a concave manner to form a first corner and a second corner of the extension.

7. The gas flow system of claim 6, wherein the main body is formed of a first sheet of material and the extension is formed of a second sheet of material coupled to the first sheet, wherein each of the first sheet and the second sheet are curved with a common radius of curvature around the first axis, wherein the first edge, the second edge, and the bottom terminal edge are edges of the first sheet, and the bottom radial edge is an edge of the second sheet, and wherein a first top edge of the first sheet and a second top edge of second sheet collectively form a top circumferential edge of the mixer, the top circumferential edge coupled to the first passage.

8. The gas flow system of claim 7, wherein the first sheet and the second sheet each have a thickness in a range of 1-2 mm.

9. The gas flow system of claim 6, wherein the main body and the extension are integrated and formed from a common piece of material, wherein the common piece of material is curved with a radius of curvature around the first axis, and wherein a first top edge of the main body and a second top edge of the extension collectively form a top circumferential edge of the mixer, the top circumferential edge coupled to the first passage.

10. The gas flow system of claim 6, wherein the bottom radial edge of the extension, at the first corner and the second corner, forms an angle in a range of 90-100 degrees.

11. The gas flow system of claim 6, wherein the extension has a second length extending from the outlet of the first passage to the bottom radial edge at a location intermediate the main body and the first corner and has a third length extending from the outlet of the first passage to the bottom radial edge at the first corner, wherein the second length is a minimum length of the extension and the third length is a maximum length of the extension, and wherein the third length is at least twice as long as the second length.

12. The gas flow system of claim 6, wherein the central longitudinal axis of the main body is positioned at a first position relative to the outlet of the first passage, the first corner is positioned at a second position relative to the outlet of the first passage, and the second corner is positioned at a third position relative to the outlet of the first passage, wherein the first position, the second position, and the third position are spaced evenly apart around a circumference of the outlet of the first passage.

13. A system for an engine, comprising:
an exhaust gas recirculation (EGR) passage through which exhaust gas from the engine is configured to flow along a first axis;
an intake passage through which intake air en route to the engine is configured to flow along a second axis, the EGR passage fluidly coupled to the intake passage at an outlet of the EGR passage; and
a mixer coupled to the EGR passage at the outlet and extending into the intake passage, the mixer including a main body extending along the first axis, the main body having an asymmetric hourglass shape and terminating vertically above a bottom side of the intake passage, the main body is configured to block a flow of the intake air along a top side and a center of the intake passage, causing the intake air to flow around the main body along the bottom side of the intake passage and each lateral side of the intake passage.

14. The system of claim 13, wherein the main body comprises a sheet of material curving around the first axis with a radius of curvature that is equal to a radius of curvature of the EGR passage, wherein the sheet of material has a first edge, a second edge opposite the first edge, and a bottom edge extending from the first edge to the second edge, and wherein the asymmetric hourglass shape is formed by the first edge and the second edge tapering inward toward a central longitudinal axis of the main body from a top of the main body to a midline of the main body and tapering outward away from the central longitudinal axis from the midline to the bottom edge, and wherein the midline is positioned closer to the bottom edge than the top of the main body.

15. The system of claim 14, wherein the mixer further includes an extension coupled to the main body and having a bottom radial edge extending from the first edge to the second edge, the extension curving around the first axis with the same radius of curvature as the main body, the bottom radial edge having a first corner and a second corner.

16. The system of claim 15, wherein the extension has a maximum length at the first corner and at the second corner, wherein the main body has an overall length along the central longitudinal axis, and wherein the overall length of the main body is at least five times as long as the maximum length of the extension.

17. A method, comprising:
flowing exhaust gas through an exhaust gas recirculation (EGR) passage along a first axis;
flowing intake air through an intake passage along a second axis, perpendicular to the first axis; and
mixing the exhaust gas with the intake air via a mixer coupled to the EGR passage, the mixer comprising a main body extending along the first axis from a top of the intake passage into the intake passage, the main body having a hourglass shape and terminating a distance from a bottom of the intake passage, the mixing including directing the intake air to flow, via the mixer, along a first lateral side of the intake passage, a second lateral side of the intake passage, and the bottom of the intake passage and blocking the intake air from flowing along the top of the intake passage; and
directing the exhaust gas to flow, via the mixer, toward a narrow portion of the hourglass shape of the main body.

18. The method of claim 17, wherein the hourglass shape of the main body directs air toward a center of the intake passage.

19. The method of claim 17, wherein the hourglass shape of the main body is formed by a first edge and a second edge opposite the first edge, and the first edge and the second edge each taper inward toward a central longitudinal axis of the main body to form the hourglass shape.

20. The method of claim 17, wherein the main body curves around the first axis.

* * * * *